(12) United States Patent
Glaser

(10) Patent No.: US 10,268,987 B2
(45) Date of Patent: Apr. 23, 2019

(54) MULTI-MODE TRANSPORTATION MANAGEMENT

(71) Applicant: GM GLOBAL TECHNOLOGY OPERATIONS LLC, Detroit, MI (US)

(72) Inventor: Stuart Glaser, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 113 days.

(21) Appl. No.: 15/491,686

(22) Filed: Apr. 19, 2017

(65) Prior Publication Data

US 2018/0308064 A1    Oct. 25, 2018

(51) Int. Cl.
| | |
|---|---|
| G01C 21/34 | (2006.01) |
| G01C 21/36 | (2006.01) |
| G05D 1/00 | (2006.01) |
| G08G 1/00 | (2006.01) |
| G06Q 10/10 | (2012.01) |
| G05D 1/02 | (2006.01) |

(52) U.S. Cl.
CPC ..... *G06Q 10/1093* (2013.01); *G01C 21/3423* (2013.01); *G01C 21/3484* (2013.01); *G05D 1/021* (2013.01); *G08G 1/202* (2013.01)

(58) Field of Classification Search
CPC ........ G01C 21/00; G01C 21/26; G01C 21/34; G06Q 10/00; G06Q 10/10; G06Q 10/1093; G08G 1/00; G08G 1/16; G08G 1/202
See application file for complete search history.

(56) References Cited

U.S. PATENT DOCUMENTS

| | | | | |
|---|---|---|---|---|
| 6,926,203 | B1* | 8/2005 | Sehr | G06Q 10/025 235/382 |
| 9,232,350 | B2* | 1/2016 | Foy | H04W 4/08 |
| 2006/0059023 | A1* | 3/2006 | Mashinsky | G06Q 10/02 705/5 |
| 2015/0095122 | A1* | 4/2015 | Eramian | G07B 15/00 705/13 |
| 2015/0095198 | A1* | 4/2015 | Eramian | G06Q 50/30 705/26.64 |
| 2016/0042303 | A1* | 2/2016 | Medina | G06Q 10/02 705/5 |
| 2017/0200321 | A1* | 7/2017 | Hummel | G06Q 30/0609 |
| 2017/0268891 | A1* | 9/2017 | Dyrnaes | G01C 21/3423 |
| 2018/0268510 | A1* | 9/2018 | Edakunni | G06Q 50/30 |

* cited by examiner

*Primary Examiner* — Yonel Beaulieu
(74) *Attorney, Agent, or Firm* — Lorenz & Kopf LLP

(57) ABSTRACT

A multi-mode transportation management method is disclosed here. An embodiment of the method processes a transportation request for a passenger. The request identifies a starting location, a destination location, and travel timing information. The method continues by identifying a multi-mode travel plan that satisfies requirements of the request. The travel plan includes at least one vehicle segment and at least one additional segment. Travel progress of the passenger is monitored to control the dispatch timing of a vehicle in accordance with the travel plan and in response to the monitored travel progress of the passenger to synchronize arrival of the vehicle with arrival of the passenger at a departure location of an approaching vehicle segment of the multi-mode travel plan.

20 Claims, 5 Drawing Sheets

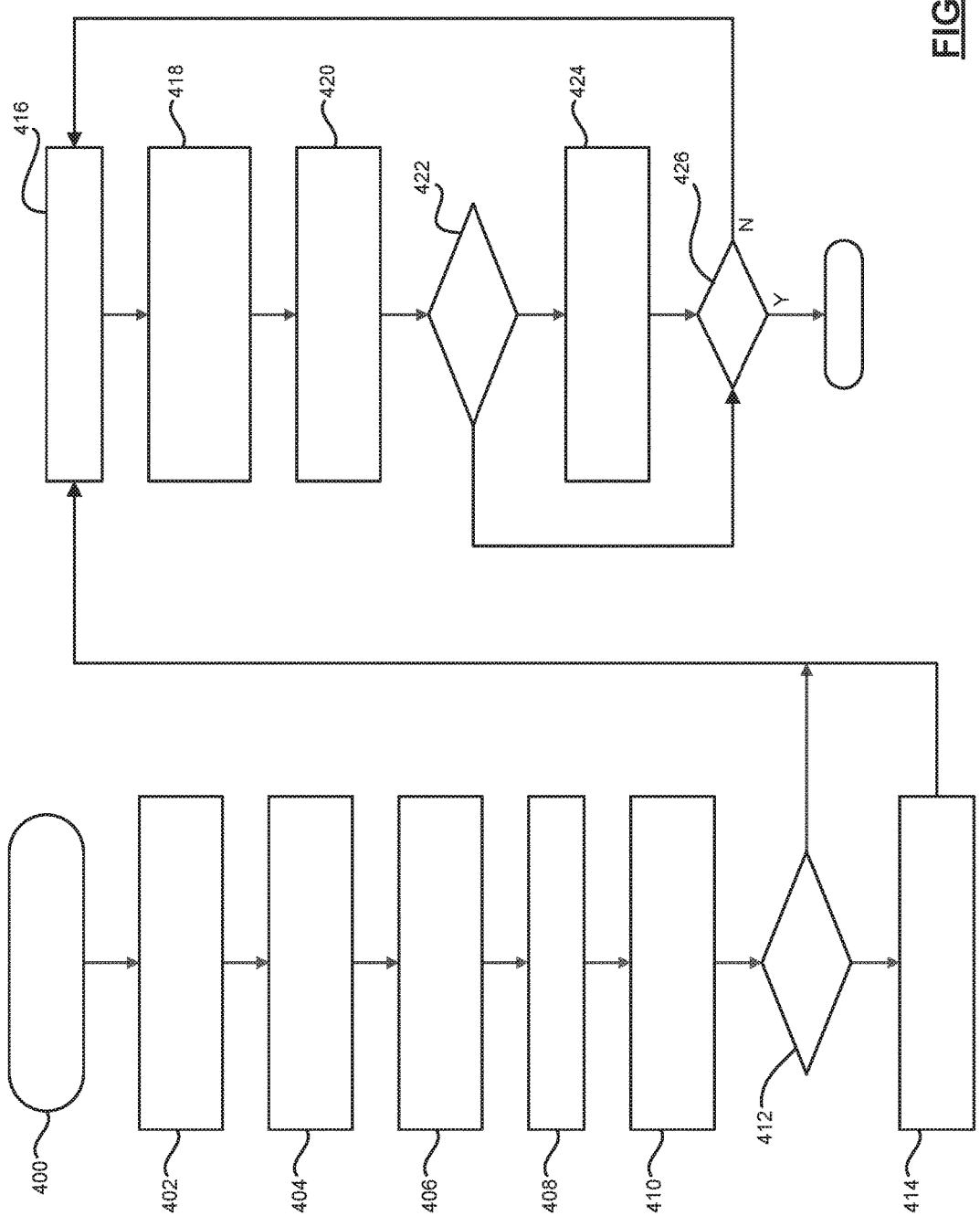

MULTI-MODE TRANSPORTATION MANAGEMENT

TECHNICAL FIELD

Embodiments of the subject matter described herein relate generally to transportation systems. More particularly, embodiments of the subject matter relate to enhanced dispatching and scheduling features suitable for use in a system that supports different modes of transportation.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Autonomous and traditional vehicles can be used to transport passengers to a desired destination. In this regard, one or more vehicles can be utilized in a multi-mode transportation system that enables passengers to take advantage of other modes of transportation, such as buses, trains, ferries, aircraft, subways, and the like. For example, a typical commute may require a train ride, a connecting bus ride, and a short taxi ride. As another example, a vacationer may fly into an airport, and then take a subway or a taxi to a hotel.

Accordingly, it is desirable to provide systems and methods that can efficiently and effectively manage transportation routes that involve different modes of transportation. In particular, it is desirable to have a methodology that intelligently dispatches vehicles (including autonomous vehicles) in an anticipatory manner to reduce passenger wait times during a multi-mode transportation route. Furthermore, other desirable features and characteristics of the present invention will become apparent from the subsequent detailed description and the appended claims, taken in conjunction with the accompanying drawings and the foregoing technical field and background.

SUMMARY

A multi-mode transportation management method is presented here. An embodiment of the method involves: processing a transportation request for a passenger, the transportation request identifying a starting location for the passenger, a destination location for the passenger, and travel timing information; identifying a multi-mode travel plan that satisfies requirements of the transportation request, the multi-mode travel plan including at least one vehicle segment and at least one additional segment; monitoring travel progress of the passenger after initiation of the multi-mode travel plan; and controlling dispatch timing of a vehicle in accordance with the multi-mode travel plan and in response to the monitored travel progress of the passenger to synchronize arrival of the vehicle with arrival of the passenger at a departure location of an approaching vehicle segment of the multi-mode travel plan.

A computer-based system is also presented here. The system includes a memory element and a processor device communicatively coupled to the memory element, the memory element having computer executable instructions stored thereon and configurable to be executed by the processor to cause the computer-based system to: process a transportation request for a passenger, the transportation request identifying a starting location for the passenger, a destination location for the passenger, and travel timing information; identify a multi-mode travel plan that satisfies requirements of the transportation request, the multi-mode travel plan including at least one vehicle segment and at least one additional segment; monitor travel progress of the passenger after initiation of the multi-mode travel plan; and control dispatch timing of a vehicle in accordance with the multi-mode travel plan and in response to the monitored travel progress of the passenger to synchronize arrival of the vehicle with arrival of the passenger at a departure location of an approaching vehicle segment of the multi-mode travel plan.

A computer-readable storage medium is also presented here. The storage medium includes executable instructions stored thereon and configurable to cause a computer-based system to perform a method including the steps of: processing a transportation request for a passenger, the transportation request identifying a starting location for the passenger, a destination location for the passenger, and travel timing information; identifying a multi-mode travel plan that satisfies requirements of the transportation request, the multi-mode travel plan including at least one autonomous vehicle segment and at least one additional segment; monitoring travel progress of the passenger after initiation of the multi-mode travel plan; and controlling dispatch timing of an autonomous vehicle in accordance with the multi-mode travel plan and in response to the monitored travel progress of the passenger to synchronize arrival of the autonomous vehicle with arrival of the passenger at a departure location of an approaching vehicle segment of the multi-mode travel plan.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The exemplary embodiments will hereinafter be described in conjunction with the following drawing figures, wherein like numerals denote like elements, and wherein:

FIG. 5 is a flowchart that illustrates an exemplary embodiment of a multi-mode transportation management process.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
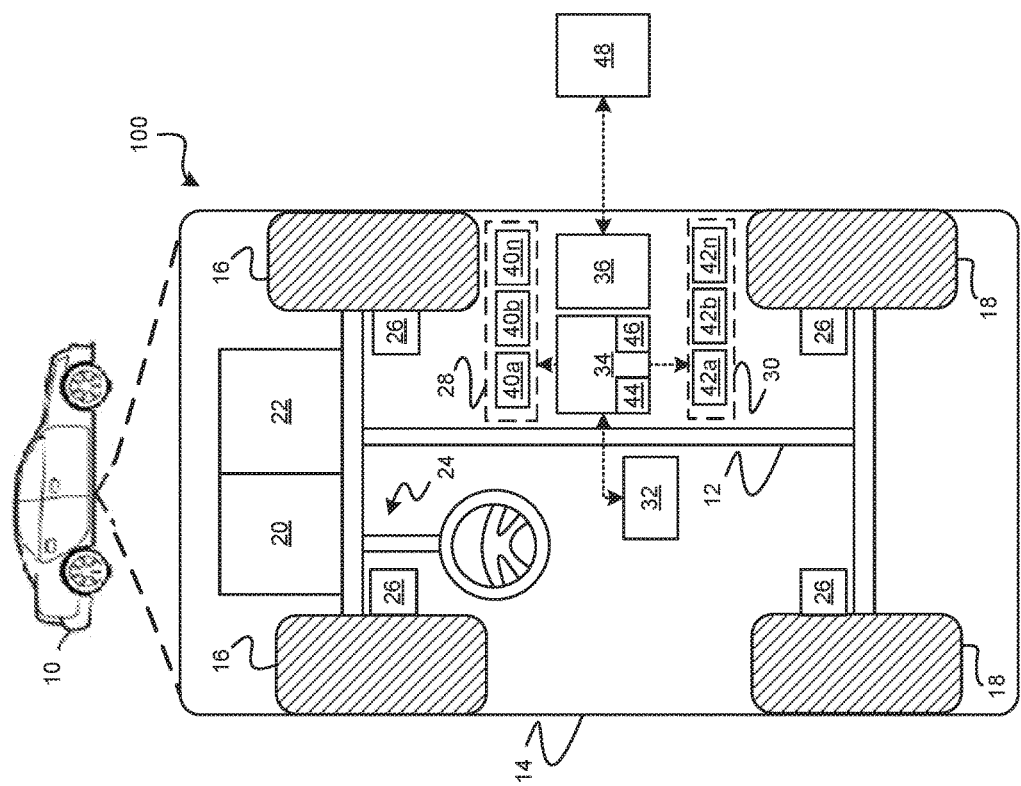
FIG. 1 is a functional block diagram illustrating an autonomous vehicle configured in accordance with various embodiments.

With reference to FIG. 1, a control system shown generally at 100 is associated with a vehicle 10 in accordance with various embodiments. In general, the control system 100 is suitably configured to operate the vehicle 10 in an autonomous manner as needed.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16, 18. The brake system 26 may, in various embodiments, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
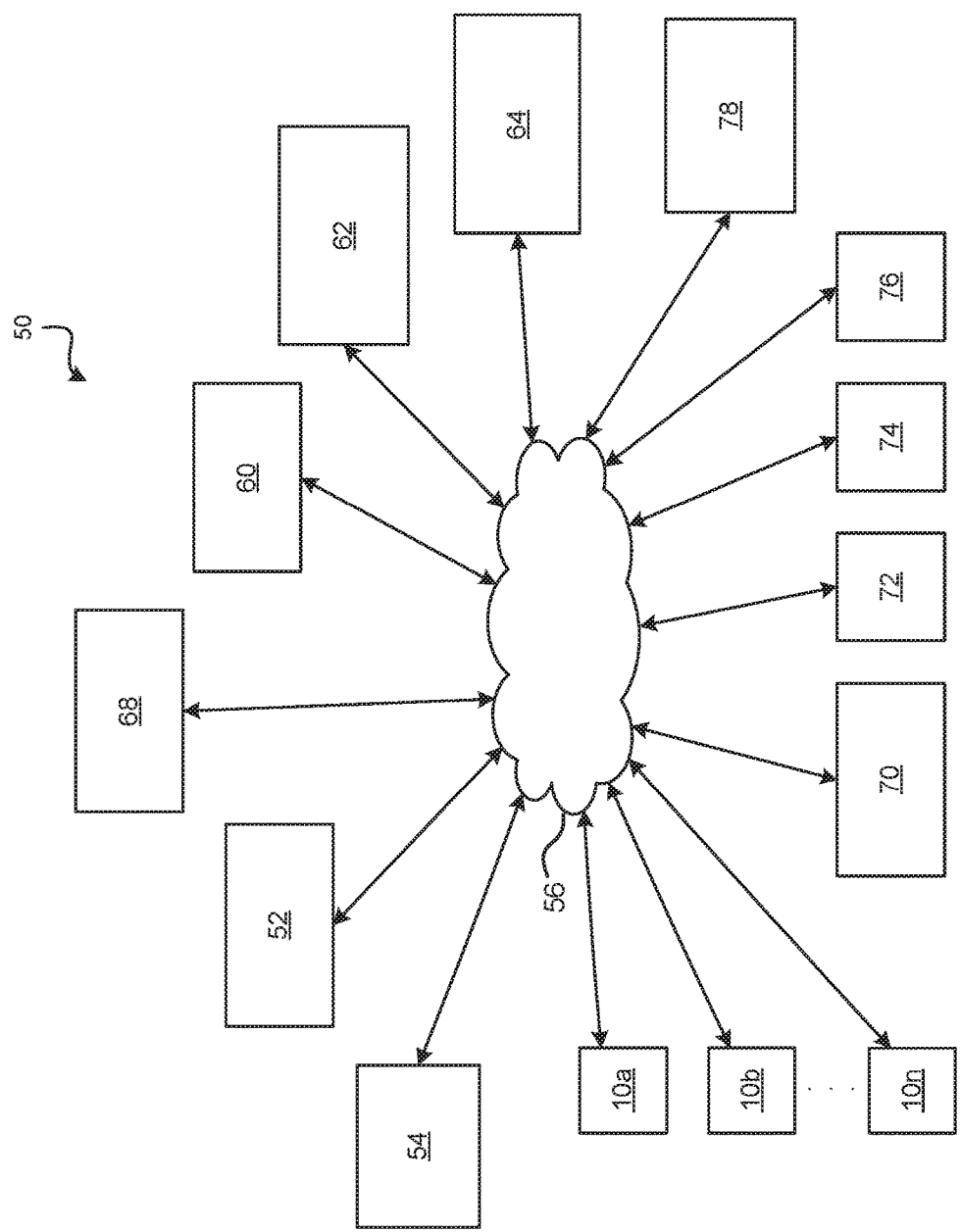
FIG. 2 is a functional block diagram illustrating a multi-mode transportation system having one or more autonomous vehicles of FIG. 1, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system. In certain embodiments, the data storage device 32 stores and updates additional information, which may be described in more detail below.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

With reference now to FIG. 2, in various embodiments, the autonomous vehicle 10 described with regard to FIG. 1 may be suitable for use in the context of a transportation system in a certain geographical area (e.g., a city, a county, a school or business campus, a shopping complex, or the like) or may simply be managed by a remote system. For example, the autonomous vehicle 10 may be associated with a multi-mode transportation system. FIG. 2 illustrates an exemplary embodiment of an operating environment for a multi-mode transportation system 50. The system 50 includes an autonomous vehicle system 52 that includes or is otherwise associated with one or more autonomous vehicles (identified in FIG. 2 as AVs 10a-10n) as described above with reference to FIG. 1. In various embodiments, the system 50 further includes one or more user devices 54 that communicate with the autonomous vehicles 10 and/or the vehicle system 52 via a communication network 56.

The communication network 56 supports communication as needed between devices, systems, and components supported by the system 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system 62. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the vehicle system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the autonomous vehicle system 52 need not be connected via the land communication system 62, but can include wireless telephony equipment so that it can communicate directly with a wireless network, such as the wireless carrier system 60.

Although only one user device 54 is shown in FIG. 2, embodiments of the transportation system 50 can support any number of user devices 54, including multiple user devices 54 owned, operated, or otherwise used by one person. Each user device 54 supported by the system 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the system 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The autonomous vehicle system 52 includes one or more backend server systems, which may be cloud-based, network-based, or resident at the particular campus or geographical location serviced by the vehicle system 52. The vehicle system 52 can be manned by at least one live advisor, at least one automated advisor, or a combination of both. The vehicle system 52 can communicate with the user devices 54 and the autonomous vehicles 10*a*-10*n* to schedule rides, dispatch autonomous vehicles 10*a*-10*n*, provide transportation status notifications, provide travel instructions, and the like. In various embodiments, the vehicle system 52 stores account information such as subscriber authentication information, vehicle identifiers, profile records, behavioral patterns, and other pertinent subscriber information.

The system 50 can include any number of predefined vehicle pickup/drop-off locations that are known to the vehicle system 52. Alternatively or additionally, the vehicle system 52 can leverage GPS technology (and/or other position or location determination techniques or methodologies) to pick up passengers at any location and/or to leave passengers at any desired destination location. In accordance with a typical use case workflow, a registered user of the vehicle system 52 creates a transportation request via the user device 54. The transportation request will typically identify a pickup or starting location for the passenger (or a current GPS location), the desired destination location for the passenger (which may be a predefined vehicle stop and/or a user-specified destination), and certain travel timing information. In this context, the travel timing information may include, without limitation: a particular departure time; a destination arrival time; an intermediate or intersegment destination arrival time (e.g., a transfer or layover time between two travel segments); a request for an immediate passenger pickup; or any combination thereof. The vehicle system 52 receives the transportation request, processes the request in an appropriate manner, and dispatches or otherwise controls one or more vehicles (e.g., an AV 10) such that the vehicle conveniently meets the passenger at a scheduled pickup point at the appropriate time. As explained in more detail below, the vehicle system 52 may cooperate with the navigation and map system 68 and/or any number of the other transportation systems to manage the dispatching of vehicles and to otherwise support certain features and functions of the multi-mode transportation system.

The navigation and map system 68 can be an independent and distinct subsystem, or it can be integrated with the vehicle system 52 and/or any of the other systems described herein. The navigation and map system 68 may be implemented with one or more backend server systems, which may be cloud-based, network-based, or resident at the particular geographical location serviced by the vehicle system 52. In some embodiments, the navigation and map system 68 includes or cooperates with compatible features, functions, or applications resident at the AVs 10 and/or resident at the user devices 54. For example, a user device 54 may include a locally installed navigation or mapping app that receives and processes data provided by the navigation and map system 68. In this regard, the user device 54 may leverage cached map data, or it may rely on map data provided via the communication network 56. The navigation and map system 68 can be used to determine passenger transportation routes to be followed by the vehicles, and it can also be used to locate and monitor the current location of passengers in an ongoing manner.

The transportation system 50 includes at least one vehicle system 52, along with at least one additional transportation system available to users of the system 50. The illustrated example depicts a variety of common transportation systems: a train/subway system 70; a ferry system 72; a bus system 74; and an airline system 76. Some or all of these transportation systems can be utilized in an embodiment of the system 50. Moreover, any number of other transportation systems 78 can be utilized if so desired. It should be appreciated that the concepts presented here are applicable to any multi-mode transportation system that can leverage at least one vehicle based system and at least one non-vehicle system.

Each of the transportation systems other than the vehicle system 52 (i.e., the train/subway system 70, the ferry system 72, the bus system 74, the airline system 76, and the other transportation system(s) 78) provides a different type or mode of transportation. Any number of the different transportation modes (including vehicles) can be used to service a route for a passenger. The different transportation systems can be operated, managed, controlled, and maintained by different entities, companies, vendors, etc. For example, in most typical scenarios, the train/subway system 70 and the bus system 74 are operated by a government entity or municipality, and the airline system 76 is operated by a private company or a publicly-owned company. Accordingly, each transportation system may have its own backend systems. These backend systems handle scheduling, billing, dispatching, monitoring, communication, and other aspects related to the day to day operation of the respective transportation systems. In accordance with the embodiments described herein, each of the supported transportation systems is communicatively coupled to the vehicle system 52

(via the network 56, for example) such that the vehicle system 52 can obtain information and data needed to support the multi-mode transportation features and functionality described herein. In this regard, the vehicle system 52 is suitably configured to obtain and process any or all of the following information, without limitation: transportation schedules for the different transportation systems; status updates and notifications for the different transportation systems, including "on time" status reports, "delayed" status reports, and the like; real-time or nearly real-time location or geographic position information for trains, ferries, buses, subways, aircraft, boats, or the like; passenger preference data that is specific to the transportation systems; and user account and billing information that is specific to the transportation systems.

As explained in more detail below, the vehicle system 52 cooperates with the other transportation systems to manage multi-mode transit routes for passengers. Accordingly, the vehicle system 52 obtains (or estimates) departure locations, arrival locations, departure times, and arrival times for the various transportation systems, and intelligently dispatches vehicles at appropriate times that coordinate with the schedules and real-time status of the other transportation systems. Moreover, the vehicle system 52 is suitably configured to generate or retrieve one or more multi-mode travel plans in response to a passenger request, wherein the travel plans are determined based on the information obtained from the various transportation systems. For example, if a passenger needs to travel from an airport to a hotel, then the vehicle system 52 can recommend the following travel plan: (1) take train number 858, departing at 5:30 PM from the airport, to the City Center station; (2) take bus number 65, departing at 6:50 PM from the City Center bus stop, to the Main Street bus stop; and (3) ride an autonomous vehicle from the bus stop to the hotel. The vehicle system 52 monitors the progress of the trip and dispatches an autonomous vehicle to the Main Street bus stop at an appropriate time that results in little to no wait time for the passenger.

Figure 3:
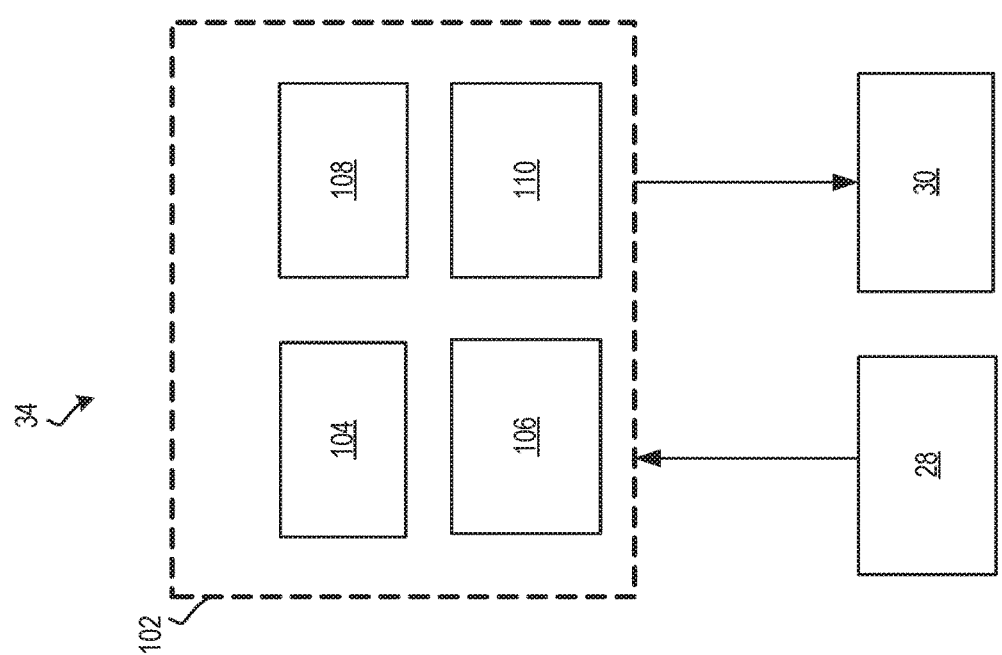
FIG. 3 is a functional block diagram illustrating an exemplary embodiment of a controller suitable for use in the autonomous vehicle shown in FIG. 1.

FIG. 3 is a functional block diagram illustrating an exemplary embodiment of the controller 34 onboard the autonomous vehicle 10 shown in FIG. 1. In accordance with various embodiments, the controller 34 implements an autonomous driving system (ADS) 100 as shown in FIG. 3. That is, suitable software and/or hardware components of the controller 34 (e.g., the processor 44 and the computer-readable storage device 46) are utilized to provide an autonomous driving system 102 that is used in conjunction with vehicle 10.

In various embodiments, the instructions of the autonomous driving system 102 may be organized by function or system. For example, as shown in FIG. 3, the autonomous driving system 102 can include a sensor fusion system 104, a positioning system 106, a guidance system 108, and a vehicle control system 110. As can be appreciated, in various embodiments, the instructions may be organized into any number of systems (e.g., combined, further partitioned, etc.) as the disclosure is not limited to the present examples.

In various embodiments, the sensor fusion system 104 synthesizes and processes sensor data and predicts the presence, location, classification, and/or path of objects and features of the environment of the vehicle 10. In various embodiments, the sensor fusion system 104 can incorporate information from multiple sensors, including but not limited to cameras, lidars, radars, and/or any number of other types of sensors.

The positioning system 106 processes sensor data along with other data to determine a position (e.g., a local position relative to a map, an exact position relative to lane of a road, vehicle heading, velocity, etc.) of the vehicle 10 relative to the environment. The guidance system 108 processes sensor data along with other data to determine a path for the vehicle 10 to follow. The vehicle control system 110 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
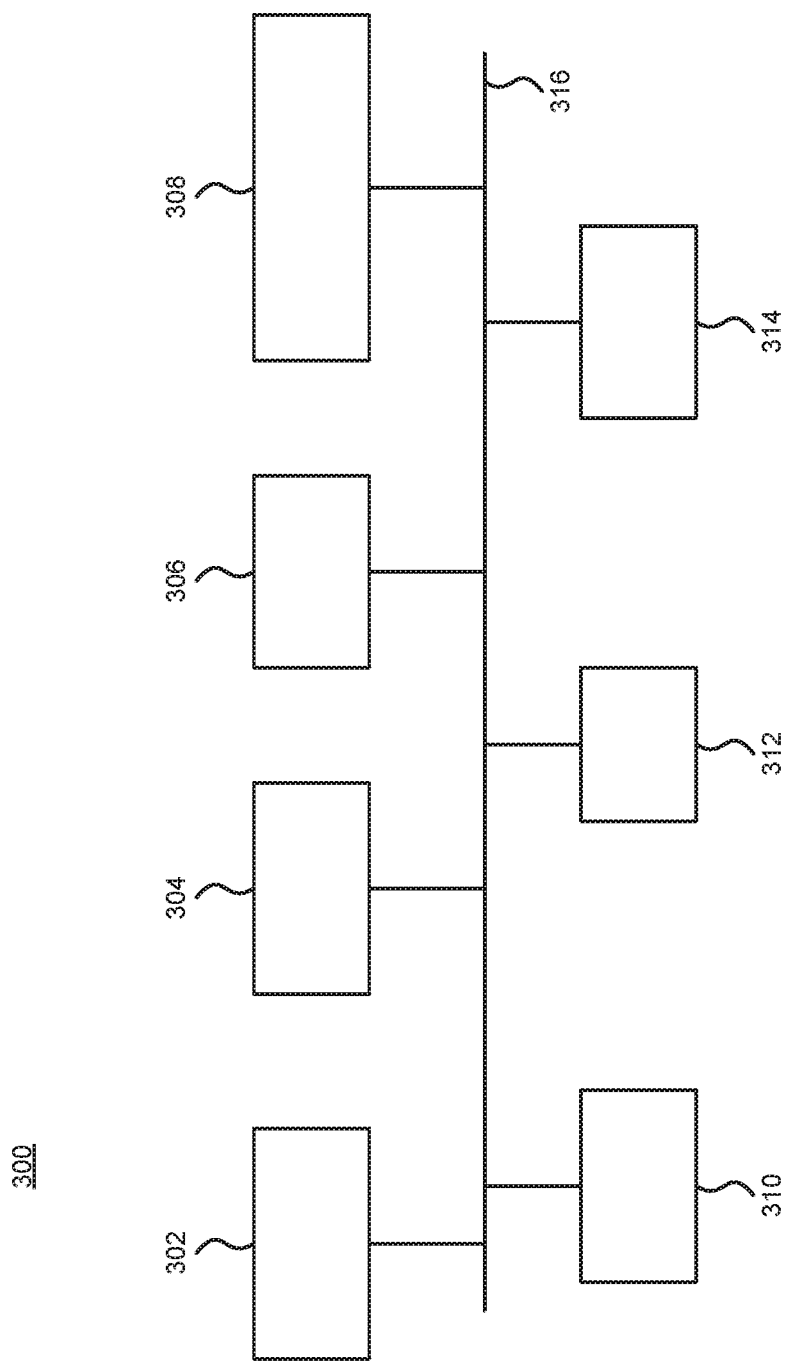
FIG. 4 is a block diagram of an exemplary embodiment of a processor-based hardware platform suitable for use in various system components described herein.

The various systems, devices, and components in the transportation system 50 may include or cooperate with computer-based or processor-based hardware. In this regard, FIG. 4 is a block diagram of an exemplary embodiment of a hardware platform 300 suitable for use in the system 50. For example, at least one instantiation of the hardware platform 300 (or something similar) can be utilized with each of the elements depicted in FIG. 2. In this regard, at least one instantiation of the hardware platform 300 (or something similar) can be deployed in each of the AVs 10, for example, as an onboard electronic control unit. The hardware platform 300 is implemented as a processor-based or computer-based device, system, or component that is designed, configured, and programmed to meet the needs of the particular system or subsystem.

The illustrated embodiment of the hardware platform 300 includes, without limitation: a processor architecture 302 having at least one processor device; a suitable amount of memory 304, which includes at least one computer/processor readable media element; a data storage apparatus 306; device-specific hardware, software, firmware, and/or features 308; a user interface 310; a communication module 312; and a display element 314. Of course, the hardware platform 300 may include additional elements, components, modules, and functionality configured to support various features that are unrelated to the subject matter described here. For example, the hardware platform 300 may include certain features and elements to support conventional functions that might be related to the particular implementation and deployment of the hardware platform 300. Conversely, an embodiment of the hardware platform 300 need not include all of the illustrated components. For example, an onboard electronic control unit or a server computing device need not include a user interface 310 or a display element 314. In practice, the elements of the hardware platform 300 may be coupled together via a bus or any suitable interconnection architecture 318.

The processor architecture 302 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. Moreover, the processor architecture 302 may be implemented as a combination of computing devices, e.g., a combination of a digital signal processor and a microprocessor, a plurality of microprocessors, one or more microprocessors in conjunction with a digital signal processor core, or any other such configuration.

The memory 304 may be realized as RAM memory, flash memory, EPROM memory, EEPROM memory, registers, a hard disk, a removable disk, a CD-ROM, or any other form of storage medium known in the art. In this regard, the memory 304 can be coupled to the processor architecture 302 such that the processor architecture 302 can read information from, and write information to, the memory 304. In the alternative, the memory 304 may be integral to the processor architecture 302. As an example, the processor architecture 302 and the memory 304 may reside in an ASIC. At least a portion of the memory 304 can be realized as a computer storage medium, e.g., a tangible computer readable media element having non-transitory processor-executable instructions stored thereon. The computer-executable instructions can be configurable such that, when read and executed by the processor architecture 302, cause the hardware platform 300 to perform certain tasks, operations, functions, and processes described in more detail herein. In this regard, the memory 304 may represent one suitable implementation of such computer-readable media. Alternatively or additionally, the hardware platform 300 could receive and cooperate with computer-readable media (not separately shown) that is realized as a portable or mobile component or platform, e.g., a portable hard drive, a USB flash drive, an optical disc, or the like.

The data storage apparatus 306 can be realized with the memory 304, or it can be implemented as a physically distinct component. The data storage apparatus 306 employs a nonvolatile storage technology to save and maintain data as needed. For example, the data storage apparatus 306 can include flash memory and/or a hard disk formatted to save data that is generated and used by the corresponding host system.

The device-specific hardware, software, firmware, and features 308 may vary from one embodiment of the hardware platform 300 to another. For example, the device-specific hardware, software, firmware, and features 308 will support telephone functions and features when the hardware platform 300 is realized as a mobile telephone, conventional personal computer functions and features if hardware platform 300 is realized as a laptop or tablet computer, vehicle-centric functions and features if the hardware platform 300 is realized as an onboard electronic control unit, etc. For the exemplary embodiments described here, the autonomous vehicles 10 and the user devices 54 can include GPS receivers and/or other location determining hardware and functionality integrated therein. Thus, the vehicles 10 and/or the user devices 54 can communicate with GPS satellites and process geographical position information to calculate their current geographical positions. In practice, certain portions or aspects of the device-specific hardware, software, firmware, and features 308 may be implemented in one or more of the other blocks depicted in FIG. 4.

The user interface 310 may include or cooperate with various features to allow a user to interact with the hardware platform 300. Accordingly, the user interface 310 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the hardware platform 300. The user interface 310 may include one or more graphical user interface (GUI) control elements that enable a user to manipulate or otherwise interact with an application via the display element 314.

The communication module 312 facilitates data communication between the hardware platform 300 and other components as needed during the operation of the hardware platform 300. Referring again to FIG. 2, the communication module 312 (of the user device 54) enables the user device 54 to communicate with the vehicle system 52 and/or the navigation and map system 68 as needed. In practice, an embodiment of the hardware platform 300 may support wireless data communication and/or wired data communication, using various data communication protocols. For example, the communication module 312 could support one or more wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Moreover, the communication module 312 could support one or more wired/cabled data communication protocols, including, without limitation: Ethernet; home network communication protocols; USB; IEEE 1394 (Firewire); hospital network communication protocols; and proprietary data communication protocols.

The display element 314 is suitably configured to enable the hardware platform 300 to render and display various screens, GUIs, GUI control elements, drop down menus, auto-fill fields, text entry fields, message fields, or the like. Of course, the display element 314 may also be utilized for the display of other information during the operation of the hardware platform 300, as is well understood. Notably, the specific configuration, operating characteristics, size, resolution, and functionality of the display element 314 can vary depending upon the practical implementation of the hardware platform 300. For example, if the hardware platform 300 is a laptop computer, then the display element 314 may be a relatively large monitor. Alternatively, if the hardware platform 300 is a cellular telephone device, then the display element 314 may be a relatively small integrated display screen, which may be realized as a touch screen. When the hardware platform 300 is implemented onboard a vehicle, the display element 314 can be integrated in an instrument panel, an instrument cluster, a head-up display, or the like.

Any number of autonomous vehicles 10 and/or traditional driver-based vehicles can be deployed in a multi-mode transportation system that manages the dispatching, routing, and operation of vehicles in a manner that cooperatives with at least one other mode of transportation (e.g., aircraft, bus, train, subway, ferry, light rail, or the like). The non-vehicle modes of transportations need not be managed or operated by the same entity, agency, or company that manages the vehicles. In certain implementations, the vehicle based transportation system includes at least one driverless vehicle that is automatically controlled to carry passengers from one location to another. In practice, however, the concepts presented herein can also be utilized with a transportation system that includes traditional (non-autonomous) vehicles. The disclosed subject matter provides certain enhanced features and functionality to what may be considered as a standard or baseline autonomous vehicle system. To this end, an autonomous vehicle based transportation system can be modified, enhanced, or otherwise supplemented to provide the additional features mentioned in more detail below.

The vehicle system 52 described here can be suitably configured to arrange and manage multi-mode transportation routes for passengers. In accordance with certain embodiments, the system 52 coordinates the dispatch of autonomous and/or traditional vehicles based on the arrival/departure schedules and operating status of other available modes of transportation. In this regard, FIG. 5 is a flowchart that illustrates an exemplary embodiment of a multi-mode transportation management process 400. The various tasks performed in connection with the process 400 may be performed by software, hardware, firmware, or any combination thereof. For illustrative purposes, the following description of the process 400 may refer to elements mentioned above in connection with FIGS. 1-4. It should be appreciated that an embodiment of the process 400 may include any number of additional or alternative tasks, the tasks shown in FIG. 5 need not be performed in the illustrated order, and the process 400 may be incorporated into a more comprehensive procedure or process having additional functionality not described in detail herein. Moreover, one or more of the tasks shown in FIG. 5 could be omitted from an embodiment of the process 400 as long as the intended overall functionality remains intact.

The multi-mode transportation management process 400 begins by receiving and processing a transportation request for a requestor/passenger (task 402). This example assumes that the request is communicated from a wireless user device, such as a smartphone owned or operated by the passenger. The request can be generated by an app running on the user device, wherein the app is maintained by or otherwise associated with the vehicle transportation system. The content of the request may vary from one embodiment to another, and may vary depending on the settings and configuration of the mobile app. As mentioned previously, this description assumes that the request includes or identifies a starting location for the passenger, a final destination location for the passenger, and relevant travel timing information (e.g., the desired departure time, the desired arrival time, or the like). In accordance with an exemplary use case, the request also includes or identifies relevant passenger preferences. In this regard, the passenger preferences can be saved at the user device in association with the mobile app and/or the passenger preferences can be uploaded to the vehicle system 52 and saved/updated as needed. The preference data for a passenger can influence the manner in which the vehicle system 52 generates, recommends, or presents multi-mode travel plans in response to transportation requests issued by the passenger. In this context, the preference data for the passenger can be designated to: reduce monetary cost to the passenger; reduce travel time; favor designated modes of transportation; minimize or limit the number of travel segments in the multi-mode travel plan; minimize or limit the number of different modes of transportation in the multi-mode travel plan; and/or favor scenic or favorite routes. In practice, any combination of the passenger preferences can be used to influence the current travel plan. Furthermore, some passenger preferences may be weighted higher than other preferences for purposes of determining the current travel plan.

The process 400 reviews the transportation request to generate, retrieve, or otherwise obtain at least one travel plan that satisfies the requirements of the request (task 404). It should be appreciated that the process 400 is capable of generating single-mode travel plans that involve only one mode of transportation and/or multi-mode travel plans that involve a plurality of different transportation modes (or multiple legs that involve the same mode of transportation). Moreover, task 404 may return only one travel plan, or a plurality of different travel plans that satisfy the passenger request. Although not a requirement of the exemplary embodiment, this description assumes that task 404 generates a plurality of candidate multi-mode travel plans for consideration by the passenger. Each candidate travel plan preferably satisfies the requirements of the transportation request. Accordingly, task 404 can consider any of the following information, in any combination: the current time; the passenger's desired departure time; the passenger's desired arrival time (final destination or waypoint destination); the initial departure location; the final destination location; any identified waypoint destination; the current GPS location of the user device; the scheduling data for the different transportation systems; current status information for the different transportation systems; traffic or accident data; weather data; and the like. If the process 400 cannot identify a travel plan that satisfies all of the requirements of the request, then task 404 can generate a travel plan that satisfies as many of the requirements as possible. This example assumes that the process 400 receives or accesses preference data for the passenger and generates at least one candidate travel plan in accordance with the preference data. Ideally, all of the candidate travel plans are generated in accordance with the preference data.

In certain embodiments, the process 400 can leverage any number of suitable pathfinding, graph traversal, or node mapping techniques, methodologies, and algorithms to determine the candidate travel plans. For example, the A* algorithm, the D* algorithm, a branch-and-bound algorithm, Dijkstra's algorithm, and similar approaches can be utilized in this context. More specifically, all transportation options can be integrated into a single graph, and an appropriate algorithm (such as A*) is applied to the graph to return a travel plan that might use multiple modes of transportation. If the A* algorithm is used, then the heuristic used can be important. In this regard, the A* algorithm is expressed as f(n)=g(n)+h(n), where g(n) represents the cost of the path from the start node n. The term h(n) is the heuristic that is used to estimate the cost of less expensive paths to the goal node. For the A* algorithm to work, the heuristic h(n) must be less than the cost function g(n), otherwise the A* algorithm becomes inadmissible.

The process 400 may continue by sending the candidate travel plans to a user device that is associated with the passenger (task 406). In practice, the mobile app running on the user device is used to present (display) the candidate travel plans to the passenger. This straightforward example assumes that at least one candidate travel plan is acceptable to the passenger and, therefore, that the passenger can simply confirm/select the desired travel plan. In practice, however, the vehicle system 52 and the process 400 can be designed to accommodate passenger customization or options that allow the passenger to view or select changes to the recommended travel plans. For example, the mobile app can display drop down menus or interactive tables that identify transportation system schedules, corresponding departure and destination locations, and the resulting time adjustments, relative to a suggested travel plan. In other words, the process 400 and the vehicle system 52 can be suitably designed to allow the passenger to "override" a recommended travel plan and/or to alter one or more legs of a recommended multi-mode travel plan.

The mobile app allows the passenger to select one of the candidate travel plans, and data that identifies the selected plan is communicated back to the vehicle system 202. Accordingly, the process 400 receives a selected one of the candidate travel plans (task 408) to be used as the current travel plan for the passenger. This example assumes that the identified travel plan is a multi-mode travel plan having at least one autonomous vehicle segment (a leg in the overall route) and at least one additional segment that utilizes a different mode of transportation other than an autonomous vehicle. The vehicle system 52 is configured to manage the current travel plan, and the process 400 continues by sending a confirmation and initial instructions, if applicable, to the user device (task 410). The mobile app on the user device presents (displays) the confirmation and any instructions to the passenger. The content and context of the initial instructions will vary in accordance with the particular scenario. For example, the instructions may include information that is intended to help the passenger continue on an upcoming segment of the multi-mode travel plan. In this regard, the instructions can direct the passenger to a specific departure location (such as a bus stop, a train station platform, a street intersection, a ferry terminal, an airport terminal, a shuttle bus pickup location, or the like), and remind the passenger of the desired departure time. The instructions may also include navigation directions to guide the passenger to the desired departure location. The instructions may also include an itinerary or summary of the travel plan, a map that depicts the planned travel route, billing or account information, and the like.

If the current travel plan requires a vehicle for the first leg of the trip (the "Yes" branch of query task 412), then the process 400 dispatches a vehicle to the passenger's current location at an appropriate time that is dictated by the travel plan and/or by the requirements of the transportation request (task 414). Although not always required, this description assumes that task 414 dispatches an autonomous vehicle to pick up the passenger. In accordance with certain embodiments, the process 400 obtains or determines the current location and movement (if any) of the passenger for purposes of directing and routing the dispatched vehicle. Thus, the system can calculate a dispatch route for the vehicle, based on a static or dynamic passenger location.

If the first leg of the travel plan does not require an automobile (the "No" branch of query task 412), then the process 414 need not perform task 414 at this time. This description assumes that the first leg of the multi-mode travel plan begins on time with the passenger onboard the appropriate mode of transportation. The process 400 continues by monitoring the travel progress of the passenger after initiation of the multi-mode travel plan (task 416). The monitoring can be based on information and data obtained from any number of sources. In certain embodiments, for example, the monitoring determines the current location and movement of the passenger in real time, substantially real time, or in accordance with any desired schedule. The current location of the passenger may be derived or estimated from any of the following, without limitation: GPS data obtained from the passenger's mobile device; the current status or schedule information for the current segment of the travel plan (which may be reported by a control system associated with the current mode of transportation); passenger-provided status information (e.g., user interaction with the mobile app running on the passenger's device); traffic monitoring systems; or the like.

The monitoring performed by the process 400 can be utilized to update the current travel plan if needed to compensate for transportation delays, traffic, emergencies, road closures, or the like (task 418). The current travel plan can also be updated or otherwise altered at the request of the passenger. If the existing travel plan is changed, then the process 400 provides a confirmation and updated instructions to the user device, as needed (task 420). The updated instructions can include any of the information and functionality described above in the context of the initial instructions (see task 410 and the related description). The monitoring performed by the process 400 is also utilized to control the dispatch timing and routing of vehicles in accordance with the multi-mode travel plan. More specifically, accurate monitoring of the passenger's travel progress can be used to synchronize the arrival of a vehicle (autonomous or traditional) with the arrival of the passenger at a departure location of an approaching vehicle segment or leg of the travel plan. Accordingly, during the current or a previous leg of the travel route, the process 400 estimates or otherwise calculates the passenger arrival time at a departure location of an approaching vehicle segment. The estimated arrival time can be calculated based on any of the following, without limitation: the monitored current location and/or movement of the passenger or user device; the status or schedule information for the current mode of transportation; the status or schedule information for one or more intervening approaching modes of transportation (for travel segments between the current leg and the approaching vehicle leg); traffic data; weather data; police or emergency services notifications; etc. Again, the goal is to determine a good rendezvous time for the dispatched vehicle that will result in little to no wait time for the passenger at the upcoming departure location. Once the desired passenger arrival time is determined, the system can dispatch and/or control the operation of a vehicle as needed to reach the designated departure location at the rendezvous time. In practice, the system can estimate the driving time of the dispatched vehicle using existing techniques and technologies. In this regard, the driving time can be estimated based on the required mileage, traffic data, accident data, weather data, the time of day, and the like.

If a vehicle is required for the next (or an impending) leg of the travel plan (the "Yes" branch of query task 422), then the process 400 continues by dispatching an autonomous vehicle to meet the passenger at the approaching departure location (task 424). The vehicle system controls the operation of the autonomous vehicle to guide it to the desired departure location at the desired time. If a vehicle is not needed for the next leg (the "No" branch of query task 422), then the process 400 need not dispatch a vehicle. As indicated by query task 426, the process 400 continues by monitoring the status and progress of the multi-mode travel plan in an ongoing manner, and by intelligently dispatching a vehicle (if needed) at an appropriate time, until the end of the route. Thus, more than one vehicle can be dispatched in a controlled manner if the travel plan includes multiple vehicle legs. The process 400 ends or exits after the passenger reaches the final destination.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A multi-mode transportation management method comprising:

processing a transportation request for a passenger, the transportation request identifying a starting location for the passenger, a destination location for the passenger, and travel timing information;

identifying a multi-mode travel plan that satisfies requirements of the transportation request, the multi-mode travel plan including a vehicle segment and an additional segment scheduled before the vehicle segment, the processing step and the identifying step occurring prior to an initial segment of the multi-mode travel plan;

monitoring travel progress of the passenger after initiation of the multi-mode travel plan;

estimating, based on the monitoring, an arrival time of the passenger at a designated departure location of the vehicle segment of the multi-mode travel plan; and controlling dispatch timing and autonomous operation of an autonomous vehicle in accordance with the vehicle segment of the multi-mode travel plan, in accordance with the estimated arrival time of the passenger at the designated departure location of the vehicle segment, and in response to the monitored travel progress of the passenger to synchronize arrival of the autonomous vehicle with arrival of the passenger at the designated departure location.

2. The method of claim 1, wherein the travel timing information comprises one or more of the following: a departure time, a destination arrival time, a request for an immediate passenger pickup, an intersegment destination arrival time.

3. The method of claim 1, further comprising:
generating a plurality of candidate travel plans that satisfy requirements of the transportation request;
sending the plurality of candidate travel plans to a user device associated with the passenger; and
receiving, from the user device, a selected one of the plurality of candidate travel plans, wherein the identifying step identifies the selected one of the plurality of candidate travel plans for use as the multi-mode travel plan.

4. The method of claim 1, wherein the monitoring step comprises:
determining a current location and movement of the passenger;
wherein the estimating step estimates the arrival time of the passenger at the designated departure location based on the determined current location and movement of the passenger.

5. The method of claim 1, wherein the monitoring step comprises:
obtaining current status or schedule information for a current segment of the multi-mode travel plan;
wherein the estimating step estimates the arrival time of the passenger at the designated departure location based on the obtained current status or schedule information.

6. The method of claim 1, wherein the monitoring step comprises:
obtaining current status or schedule information for at least one approaching segment of the multi-mode travel plan;
wherein the estimating step estimates the arrival time of the passenger at the designated departure location based on the obtained current status or schedule information.

7. The method of claim 1, further comprising:
providing instructions to the passenger in advance of an upcoming segment of the multi-mode travel plan, the instructions comprising information intended to help the passenger continue on the upcoming segment of the multi-mode travel plan.

8. The method of claim 1, wherein the identifying step comprises:
accessing preference data for the passenger; and
generating the multi-mode travel plan in accordance with the preference data for the passenger.

9. The method of claim 8, wherein the preference data for the passenger influences the generating step to do one or more of the following: reduce monetary cost to the passenger; reduce travel time; favor designated modes of transportation; minimize or limit the number of travel segments in the multi-mode travel plan; minimize or limit the number of different modes of transportation in the multi-mode travel plan; favor scenic or favorite routes.

10. The method of claim 1, wherein the identifying step comprises:
obtaining scheduling data from at least one candidate transportation system that provides a mode of transportation; and
generating the multi-mode travel plan in accordance with the scheduling data.

11. A computer-based system comprising a memory element and a processor device communicatively coupled to the memory element, the memory element having computer executable instructions stored thereon and configurable to be executed by the processor to cause the computer-based system to:
process a transportation request for a passenger, the transportation request identifying a starting location for the passenger, a destination location for the passenger, and travel timing information;
identify a multi-mode travel plan that satisfies requirements of the transportation request, the multi-mode travel plan including a vehicle segment and an additional segment scheduled before the vehicle segment, the processing and the identifying occurring prior to an initial segment of the multi-mode travel plan;
monitor travel progress of the passenger after initiation of the multi-mode travel plan;
estimate, based on the travel progress as monitored, an arrival time of the passenger at a designated departure location of the vehicle segment of the multi-mode travel plan; and
control dispatch timing and autonomous operation of an autonomous vehicle in accordance with the vehicle segment of the multi-mode travel plan, in accordance with the estimated arrival time of the passenger at the designated departure location of the vehicle segment, and in response to the monitored travel progress of the passenger to synchronize arrival of the autonomous vehicle with arrival of the passenger at the designated departure location.

12. The system of claim 11, wherein the computer executable instructions are configurable to cause the computer-based system to:
generate a plurality of candidate travel plans that satisfy requirements of the transportation request;
send the plurality of candidate travel plans to a user device associated with the passenger; and
receive, from the user device, a selected one of the plurality of candidate travel plans, wherein the identifying step identifies the selected one of the plurality of candidate travel plans for use as the multi-mode travel plan.

13. The system of claim 11, wherein the computer executable instructions are configurable to cause the computer-based system to:
determine a current location and movement of the passenger;
wherein the estimating estimates the arrival time of the passenger at the designated departure location based on the determined current location and movement of the passenger.

14. The system of claim 11, wherein the computer executable instructions are configurable to cause the computer-based system to:
obtain current status or schedule information for a current segment of the multi-mode travel plan;
wherein the estimating estimates the arrival time of the passenger at the designated departure location based on the obtained current status or schedule information.

15. The system of claim 11, wherein the computer executable instructions are configurable to cause the computer-based system to:
obtain current status or schedule information for at least one approaching segment of the multi-mode travel plan;
wherein the estimating estimates the arrival time of the passenger at the departure location based on the obtained current status or schedule information.

16. The system of claim 11, wherein the computer executable instructions are configurable to cause the computer-based system to:
accessing preference data for the passenger; and
generating the multi-mode travel plan in accordance with the preference data for the passenger.

17. The system of claim 16, wherein the preference data for the passenger influences the generating step to do one or more of the following: reduce monetary cost to the passenger; reduce travel time; favor designated modes of transportation; minimize or limit the number of travel segments in the multi-mode travel plan; minimize or limit the number of different modes of transportation in the multi-mode travel plan; favor scenic or favorite routes.

18. The system of claim 11, wherein the computer executable instructions are configurable to cause the computer-based system to:
obtain scheduling data from at least one candidate transportation system that provides a mode of transportation; and
generate the multi-mode travel plan in accordance with the scheduling data.

19. A computer-readable storage medium comprising executable instructions stored thereon and configurable to cause a computer-based system to perform a method comprising the steps of:
processing a transportation request for a passenger, the transportation request identifying a starting location for the passenger, a destination location for the passenger, and travel timing information;
identifying a multi-mode travel plan that satisfies requirements of the transportation request, the multi-mode travel plan including an autonomous vehicle segment and an additional segment scheduled before the autonomous vehicle segment, the processing step and the identifying step occurring prior to an initial segment of the multi-mode travel plan;
monitoring travel progress of the passenger after initiation of the multi-mode travel plan;
estimating, based on the monitoring, an arrival time of the passenger at a designated departure location of the autonomous vehicle segment of the multi-mode travel plan; and
controlling dispatch timing and autonomous operation of an autonomous vehicle in accordance with the autonomous vehicle segment of the multi-mode travel plan, in accordance with the estimated arrival time of the passenger at the designated departure location of the autonomous vehicle segment, and in response to the monitored travel progress of the passenger to synchronize arrival of the autonomous vehicle with arrival of the passenger at the designated departure location.

20. The computer-readable storage medium of claim 19, wherein:
the executable instructions are configurable to cause the computer-based system to estimate the arrival time of the passenger at the designated departure location based on one or more of the following: a current location of the passenger; detected movement of the passenger; status or schedule information for a current segment of the multi-mode travel plan; status or schedule information for an approaching segment of the multi-mode travel plan.

* * * * *